Aug. 1, 1967  H. S. BLANCHARD  3,334,080
CURABLE COMPOSITION COMPRISING POLYETHYLENE AND
2,5-BIS(I-BUTYLPEROXY)-2,5-DIPHENYHEXYNE-3
Filed Aug. 21, 1961
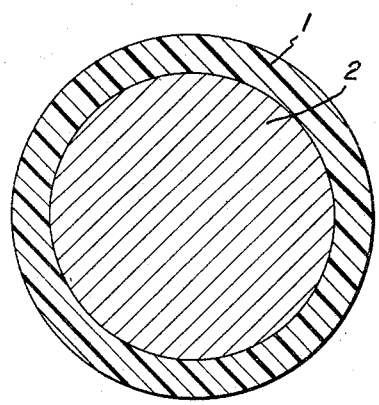
Inventor:
Harry S. Blanchard,
by *[signature]*
His Agent.

United States Patent Office 3,334,080
Patented Aug. 1, 1967

3,334,080
CURABLE COMPOSITION COMPRISING POLY-
ETHYLENE AND 2,5-BIS(t-BUTYLPEROXY)-2,5-
DIPHENYLHEXYNE-3
Harry S. Blanchard, Schenectady, N.Y., assignor to General Electric Company, a corporation of New York
Filed Aug. 21, 1961, Ser. No. 132,664
2 Claims. (Cl. 260—94.9)

This invention relates to polyethylene-containing compositions having incorporated therein an acetylenic unsaturated compound, the cured products thereof, and the process of producing these products. More particularly, this invention relates to compositions comprising an admixture of a polyethylene-containing composition and an acetylenic unsaturated compound corresponding to one of the formulae (A)

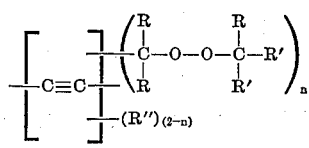

where $n$ is one of the integers 1, 2; each R is a monovalent radical selected from the group consisting of alkyl, haloalkyl, cycloalkyl, halocycloalkyl, alkaryl, haloalkaryl, aralky, haloaralkyl, aryl and haloaryl; each R' is the same as R and in addition, are divalent alkyl (alkylene and alkylidene) and haloalkyl (haloalkylene and haloalkylidene) radicals which, together with the tertiary carbon atom connected to the peroxide oxygen, form a cyclic ring, and R" is the same as R and in addition, hydrogen; and (B)

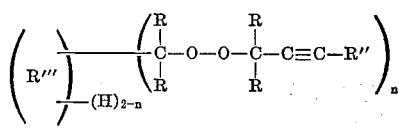

where $n$, R and R" have the same meaning as defined above for formula (A) and R''' is a divalent radical selected from the group consisting of alkylene, haloalkylene, cycloalkylene, halocycloalkylene, aralkylene, haloaralkylene, alkarylene, haloalkarylene, arylene and haloarylene.

Polyethylene is readily available commercially in a wide variety of forms usually associated with a change in density. The density ranges from a low of about 0.92 up to a high value of about 0.96. As the density increases, the degree of crystallinity and the softening point of the polymers increases. The increase in softening point associated with a high density has permitted such polyethylenes to be used in applications not suitable for the lower density material. Ethylene polymers are also available wherein any of the various polyethylene compositions discussed above are blended with other polymers or where ethylene is copolymerized with other polymerizable monomers, for example, alkenes having from 3 to 8 carbon atoms to produce a wide variety of polyethylene compositions.

Many attempts have been made with such polyethylene compositions to provide finished products having a higher resistance to cold flow and a greater high temperature resistance. One approach has been to irradiate such compositions to cause cross-linking but the limitations on penetration of irradiation and the inability to focus the radiation uniformly around the complete periphery of an object, e.g., an insulated wire, has somewhat limited such applications to films or sheets of relatively thin gauge. Furthermore, since the highly crystalline polymers such as those containing the high density polyethylene tend to trap free radicals generated by the irradiation rather than cause cross-linking, special precautions must be taken to convert the trapped radicals to cross-links.

Attempts have also been made to cross-link or cure the polyethylene compositions with agents such as peroxides and other chemicals capable of liberating free radicals. However, many of these materials have the serious disadvantage that they dissociate into free radicals at relatively low temperatures, so that during the compounding of low density polyethylenes at relatively low temperatures, they decompose so readily that they cause at least some premature curing of the composition while it is being compounded, and before it is in the final desired shape. Such precuring is designated as scorch.

Other peroxides may be incorporated under certain conditions with the ethylene polymers without causing scorch, but usually this requires either very careful control of the processing conditions using relatively short processing times or a use of the lower softening point polyethylene compositions if longer processing times are required. In applications such as extrusion or injection molding where long dwell times in the extrusion or injection cylinder are encountered, even these peroxides cause serious premature crosslinking.

As can be seen from the above discussion, one of the difficulties in treating polyethylene compositions with peroxides is that the polyethylene compositions tend to be prematurely cured while the peroxides are either being blended into the polymer during the compounding operation wherein the peroxide along with fillers, dyes, and pigments, if desired, are being incorporated into the polyethylene composition. This is especially true of those polyethylene compositions having the higher softening temperatures, such as those polyethylene compositions containing high density polyethylene either alone or mixed with polypropylene, or premature curing is caused during the extruding or injection molding operation in the extrusion cylinder. As a result, while the compounded polyethylene composition is being shaped, stresses are incorporated into the product which exert themselves when the formed product is subject to heat, even below its flow point. This stress condition and the consequences thereof will hereinafter be referred to as "plastic memory." Although cured polyethylene possesses an elevated flow point resulting in enhanced high temperature utility, the presence of such plastic memory results in distortion even below the flow point thus making it extremely difficult to obtain a cured, smoothly finished product which will retain its shape at elevated temperatures normally encountered in use.

I have now discovered that ethylene polymers can be cured with a class of acetylenic unsaturated compounds containing peroxy groups whereby the cured product has increased form stability at elevated temperatures, is resistant to certain solvents and has improved tensile strength, tear strength, etc., without exhibiting plastic memory. These materials can be as readily used with the high density polyethylene compositions having high softening temperatures as they can with polyethylene compositions having low density and low softening temperatures. Furthermore, this class of acetylenic unsaturated peroxy compounds permits the compounded polyethylene composition containing them to be readily extruded or injection molded without precuring in the injection or extrusion cylinder, but the shaped article can be cured immediately by heating to the required higher temperature, e.g., in the injection mold or in a curing chamber through which the extruded article passes on leaving the extruder.

My invention will be readily understood by those skilled in the art from the following more detailed description which should be read in conjunction with the drawing which shows as the sole figure a cross-sectional view of an insulated electrical conductor within the scope of the present invention.

The peroxides of the present invention may be represented by one of the following formulae:

(A)
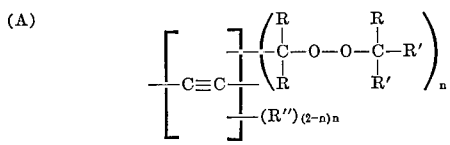

where $n$ is one of the integers 1, 2; each R is a monovalent radical selected from the group consisting of alkyl, haloalkyl, cycloalkyl, halocycloalkyl, alkaryl, haloalkaryl, aralkyl, haloaralkyl, aryl, and haloaryl; each R' is the same as R and in addition, are divalent alkyl and haloalkyl radicals which, together with the tertiary carbon atom connected to the peroxide oxygen, form a cyclic ring, and R'' is the same as R and in addition hydrogen; and (B)
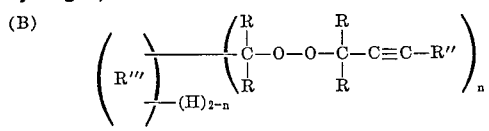

where $n$, R and R'' have the same meaning as defined above for formula (A) and R''' is a divalent radical selected from the group consisting of alkylene, haloalkylene, cycloalkylene, halocycloalkylene, aralkylene, haloaralkylene, alkarylene, haloalkarylene, arylene and haloarylene.

Typical examples of the radicals that R, R' and R'' may be are alkyl radicals, for example, methyl, ethyl, propyl, butyl, pentyl, hexyl, heptyl, octyl, nonyl, decyl, undecyl, octadecyl, etc., and isomers thereof; for example, secondary-butyl, isobutyl, tertiary-butyl, isoamyl, secondary-amyl, tertiary-amyl, etc.; cycloalkyl radicals, for example, cyclopropyl, cyclobutyl, cyclopentyl, cyclohexyl, cycloheptyl, cyclooctyl, etc., including both cycloalkyl radicals on which there are other substituents such as alkyl and aryl radicals, for example, methylcyclobutyl, ethylcyclopentyl, tertiary-butyl-methylcyclohexyl, isopropylcyclohexyl, phenylcyclohexyl, tolylcyclohexyl, etc., as well as those radicals wherein the cycloalkyl is a substituent of the hydrocarbon radical, for example, cycloalkyl-alkyl radicals, for example, cyclopropylmethyl, cyclopentylethyl, cyclohexylpropyl, and cycloalkylaryl radicals, for example, cyclohexylphenyl, cyclopentyltolyl, etc.; aralkyl radicals, for example, benzyl, phenylethyl, tolypropyl, naphthylbutyl, etc.; aryl radicals, for example, phenyl, biphenyl, naphthyl, anthracyl, including alkaryl (alkyl-substituted aryl) radicals, such as tolyl, xylyl, ethylphenyl, tertiarybutylphenyl, propylbiphenyl, ethylnaphthyl, tertiarybutylnaphthyl, propylnaphthyl, etc., and also including the above radicals wherein one or more of the hydrogen atoms is substituted with a halogen, examples of which are fluorine, chlorine, bromine and iodine, to produce halo-substituted hydrocarbon radicals, examples of which are mono-, di- and trifluoromethyl, mono-, di-, tri- tetra- and pentachloroethyl, dichlorotrifluoroethyl, the bromoethyls, the iodoethyls, the chloropropyls, the fluorocyclopentyls, the chlorocyclohexyls, the chlorobenzyls, the fluorophenylethyls, the bromophenyls, the iodotolyls, etc. As indicated above, the two R's taken together along with the tertiary carbon atom attached to the peroxide oxygen, may form a hydrocarbon cyclic radical represented by the structural formula

examples of which are the cycloalkyl and halocycloalkyl radicals, specific examples of which have been given above. Mixtures of two or more of these acetylenic unsaturated compounds may be used as curing agents for the polyethylene compositions.

Of the acetylenic unsaturated compounds corresponding to the above formula, the preferred compounds are:

(A) 2,5-bis(t-butylperoxy)-2,5-dimethylhexyne-3

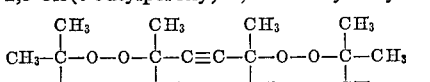

(B) 2,5-bis(t-butylperoxy)-2,5-diphenylhexyne-3

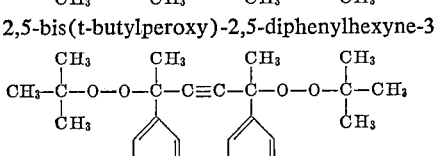

(C) 2,5-bis(α,α-dimethylbenzylperoxy) - 2,5 - dimethylhexyne-3

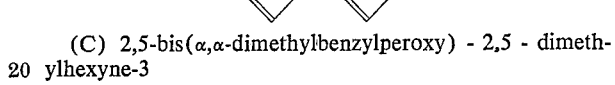

(D) 2,5-bis(α,α-dimethylbenzylperoxy) - 2,5 - diphenylhexyne-3

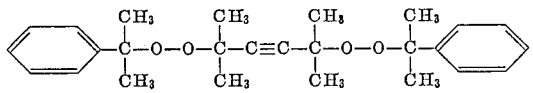

(E) 3-(α,α-dimethylbenzylperoxy)-3-methylbutyne-1

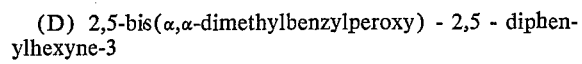

(F) 2,5-bis(1,1-dimethylpropyneperoxy) - 2,5 - dimethylhexane

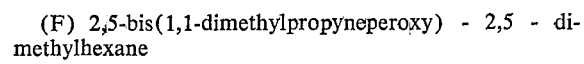

The acetylenic unsaturated compounds of this invention may be prepared by any of the methods known to the art; for example, by the method described by N. A. Milas and O. L. Mageli in the J. Am. Chem. Soc., 74, 1471–1473 (1952). In general, the method involves the reaction of a hydroperoxide with an alcohol in the presence of sulfuric acid. In preparing the hydroperoxides the desired alcohol is reacted with hydrogen peroxide also in the presence of sulfuric acid, both reactions being carried out at a low temperature. Although it is possible to make the acetylenic unsaturated compounds of this invention by either reacting a monoalcohol with hydrogen peroxide to form the hydroperoxide and then reacting this hydroperoxide with the acetylenic glycol or acetylenic alcohol, it is preferable, to avoid side reactions, to react the acetylenic glycol or acetylenic alcohol with the hydrogen peroxide to form the dihydroperoxide of the glycol or monoperoxide of the alcohol and then react this with the appropriate alcohol to give the desired end groups; for example, in making 2,5-bis(t-butylperoxy)-2,5-dimethylhexyne-3, the compound may be made by reacting tertiary-butyl alcohol with hydrogen peroxide to form tertiary-butyl hydroperoxide which is reacted with 2,5-dihydroxy-2,5-dimethylhexyne-3 to produce the desired compound. Preferably, however, it is made by reacting 2,5-dihydroxy-2,5-dimethylhexyne-3 with hydrogen peroxide to form the 2,5-bis(hydroperoxy)-2,5-dimethylhexyne-3, which is reacted with tertiary-butyl alcohol to produce the desired compound.

In preparing the polyethylene compositions containing the acetylenic unsaturated compounds, the polyethylene composition may be mixed directly on a two-roll rubber mill with the acetylenic unsaturated compound with or without the use of solvents. If desired, other mixing apparatus may be used, such as a Banbury mixer, etc. If dyes, fillers, and pigments are to be incorporated, they are generally added and uniformly distributed through the polyethylene composition prior to the addition of the peroxide, although all may be added at once if desired. In general, the mixing equipment is heated to a temperature slightly above the softening temperature of the polymer so that the polyethylene compositions will flux and permit the other ingredients to be readily and uniformly incorporated therein. In general, the lowest temperature which will provide this desired degree of fluxing is used, since there is no advantage to be gained by the use of any higher temperatures. Temperatures of from 125 to 150° C. may safely be used for compounding the polyethylene compositions with the acetylenic unsaturated compounds without danger of causing premature curing of the composition.

Thereafter, the composition may be fabricated, molded, extruded, injection molded, or calendered, etc., by suitable methods. The temperature at which the shaping operation is effected may be varied widely, depending on the specific acetylenic unsaturated compound, or whether it is desired that shaping and curing be accomplished in one operation. If desired, the composition can be cured after shaping by a final heat treatment at about 160° C., and preferably about 175° C. or higher, but below the decomposition temperature of the polymeric composition. Curing of the polyethylene composition containing the acetylenic unsaturated compound can be effected at ordinary pressures or at superatmospheric pressures, such as from 10 to 1000 lbs./sq. inch or more in a mold or press. If a surface cure alone is desired without affecting the interior, only the surface layer need be treated with the acetylenic unsaturated compound, for example, by heating the surface with a solution of the acetylenic compound in a solvent and thereupon heat cured. Thin films of filaments extruded and treated in this manner will be sufficiently cured throughout. Alternatively, a polyethylene composition may be extruded as a coating over another composition not containing the acetylenic compound.

The optimum amount of the acetylenic unsaturated compound to be incorporated in the composition depends on the particular acetylenic compound selected, the time and temperature of the heat treatment and the degree of cure desired in the polymer. Generally, if the polyethylene composition containing the acetylenic unsaturated compound is cured between 160–200° C., about 0.1–20% of the acetylenic unsaturated compound based on the weight of the polyethylene composition may be used, but preferably 0.5–10% and more particularly 1–6%, will give satisfactory results. However, if polyethylene compositions of greater reduced thermoplasticity are desired, greater amounts of the acetylenic compound may be used. Of course, the time and temperature required for the cure will depend on the specific acetylenic unsaturated compound, as well as the temperature employed. For example, for a given cure temperature, the higher the amount of acetylenic unsaturated compound used, the less time will be required to obtain the same degree of cure. Likewise, for a given percentage of acetylenic unsaturated compound, the higher the temperature used, the less time will have to be used for a given degree of cure. In general, if from 1 to 6% of the acetylenic unsaturated compound is used, in the polyethylene composition, it may be sufficiently cured in a temperature range of 160–200° C. in from 5–30 minutes.

The products of this curing process are characterized by decreased solubility in organic solvents, decreased thermoplasticity, enhanced tensile strengths at both room and elevated temperatures, and enhanced elevated temperature tear strength, etc., as compared to the uncured polyethylene compositions. Although polyethylene compositions which have not been cross-linked will totally dissolve in solvents, the polyethylene compositions which have been sufficiently cured will not dissolve at elevated temperatures to an appreciable extent, but will swell when in contact with the solvents. The degree of cure in these polymers can be evaluated by the amount of swelling which occurs when the samples are placed in contact with certain solvents. Since resistance of polymeric materials to solvents is a measure of degree of cure, this is a convenient method of measuring the curing efficiency of these acetylenic unsaturated compounds. Toluene and other aromatic or substituted aromatic compounds such as xylene, mesitylene, nitrobenzene, benzene, etc., and mixtures of such compounds, are solvents for polyethylene at elevated temperatures (90–100° C.). Another important advantage of this invention is the fact that at temperatures above the softening point of ordinary available polyethylene compositions (100–125° C.) and under certain loads, the cross-linked polyethylene compositions of this invention will flow only to a small extent, whereas the polyethylene compositions which had not been cured will completely deform.

In addition to the above-named properties, the polyethylene compositions of this invention do not exhibit plastic memory. Thus, the cured polyethylene compositions will preserve their shape without distortion even at elevated temperatures which are below the flow point of the cured polymer.

The ethylene polymers with which this invention is concerned include not only the homopolymers of ethylene, but also polyethylene which has been blended with up to 75 weight percent of the blend with one or more polymers, typical examples of which are: another polymerized alkene having from 3 to 8 carbon atoms, for example, polypropene (sometimes called polypropylene), polybutene (polybutylene) polyisobutene (polyisobutylene), polypentene, polyhexene, polyheptene, and polyoctene, etc.; polymers containing polymerized conjugated butadiene, for example, polybutadiene itself, polyisoprene, polychloroprene, as well as copolymers with other materials, for example, copolymers of butadiene and styrene containing from 20 to 80% by weight butadiene, an example of which is SBR rubber, copolymers of butadiene and acrylonitrile, wherein the butadiene may comprise from about 55 to 80% of the total weight of the butadiene and the acrylonitrile, an example of which is Hycar-OR; organopolysiloxanes having carbon-to-silicon linkages such as those disclosed and claimed in Agens Patent 2,448,756, Sprung Patents 2,448,556 and 2,484,595, Krieble et al. Patent 2,457,688, Hyde Patent 2,490,357, Marsden Patent 2,521,528, Warrick Patent 2,541,137, etc.; polymers of monohydric alcohol esters of acrylic acid, for example, polymeric methyl methacrylate, polymeric butyl acrylate, such polymeric materials ranging from both tough, pliable rubber-like substances in the case of polymeric methyl acrylate to softer and more elastic products in the case of the polymeric longer chain alkyl acrylates (examples of polymeric alkyl acrylates which may be employed are more particularly described in Semegen Patents 2,411,899, 2,412,475, and 2,412,476); polystyrenes; chlorosulfonated polyethylenes; chlorinated polyethylenes; chlorinated polyolefins; etc.; mixtures of these above-described polymeric compositions may also be incorporated into the polyethylene compositions. Furthermore, the ethylene may be copolymerized or graft copolymerized with up to 75 weight percent of the copolymer with at least one alkene having from 3 to 8 carbon atoms in the molecule, for example, ethylene may be copolymerized with alkenes such as propylene (also known as propene), butene (butylene), isobutene (isobutylene), propene, hexene, heptene, octene, etc. Mixtures of these polymers and copolymers may likewise be used.

The polyethylene compositions may be used alone or in conjunction with fillers to modify the properties thereof. Particularly useful fillers are the carbon blacks, various forms of silica, especially the silica aerogels, the xerogels and fume silicas, which may, if desired, be treated with hydroprobic agents such as organosilicon halides, such as those disclosed in U.S. Patents 2,657,149—Iler, 2,510,661—Safford, 2,563,555—Safford, and 2,967,168—Hurd. Other fillers are the naturally occurring clays, e.g., Catalpo clay, diatomaceous earth, chromic oxide, titanium dioxide, ferric oxide, calcium carbonate, cadmium sulfide, asbestos, wood flour, cellulose fibers, mineral fibers, glass fibers, alumina, lithopone, talc, calcium silicate, etc.

Dyes and pigments may be added to attain the desired color, and plasticizers may be added if desired to obtain any desired degree of flexibility.

In order that those skilled in the art may better understand how the present invention may be practiced, the following examples are given by way of illustration and not by way of limitation. All parts are by weight, unless otherwise stated.

*Example 1*

Three compositions were made up, each containing 100 parts low density polyethylene, 75 parts of a soft, reinforcing carbon black. To Composition A, 2 parts (2% by weight of the polyethylene) of bis($\alpha,\alpha$-dimethylbenzyl)peroxide was added; to B was added 2 parts (2% by weight of the polyethylene) of 2,5-bis(t-butylperoxy)-2,5-dimethylhexane; to Composition C was added 2 parts (2% by weight of the polyethylene) of 2,5-bis(t-butylperoxy)-2,5-dimethylhexyne-3. Each of these compositions was uniformly compounded by milling for 20 minutes on differential rolls heated to 100° C. Each of the compositions when tested at 300° F. after 1½ minutes of conditioning was found to have essentially the same plasticity, i.e., 19, 18 and 18½ for Compounds A, B and C, respectively. The Mooney Scorch values at 300° F. after 1½ minutes of conditioning were 4½ minutes, 8 minutes and 29½ minutes for Compounds A, B and C, respectively, showing that the polyethylene composition containing the acetylenic unsaturated compound was far less susceptible to scorch than even the polyethylene composition containing the closely related analog. This means that such acetylenic unsaturated compounds would be very useful for preparing curable compositions which would not precure during the processing step at elevated temperatures as would be encountered, for example, in the formation of insulated electrical conductors, when the polyethylene composition containing the acetylenic unsaturated compound is extruded on wire and subsequently cured, for example by passing through a steam chamber, dielectric heating, or an electrically heated air oven, there is no danger of the material prematurely curing in the extruded cylinder as would be experienced by using the other curing catalysts.

*Example 2*

Three batches of filled polyethylene were made, each containing 100 parts of a high-density polyethylene and 75 parts of a soft, reinforcing carbon black; Sample A was used as a control, Sample B was compounded with 6 parts of 2,5-bis(t-butylperoxy)-2,5-dimethylhexane, and Sample C was compounded with 6 parts of 2,5-bis(t-butylperoxy)-2,5-dimethylhexyne-3. Each of these compounds was thoroughly mixed to form uniform compositions by mixing in a Banbury mixer at a temperature of 100° C. for 10 minutes. The materials were molded in the form of sheets 4 inches x 4 inches x 1/16 inch in size, at a temperature of 330° F. (166° C.) for 15 minutes under a pressure of 1000 lbs./sq. inch. Dumbbell samples for tensile strengths were cut from each of these molded sheets, except for Compound A, which shattered when attempts were made to cut the dumbbells with a die. At room temperature Compound B had a tensile strength of 2951 lbs./sq. inch, whereas Sample C had a tensile strength of 3475 lbs./sq. inch, showing that the acetylenic unsaturated compound was able to produce a stronger, cured sample than its closely related saturated analog. Both samples were more flexible than Compound A, showing that both curing agents were capable of improving the impact strength of the filled, uncured composition.

*Example 3*

A composition containing 100 parts low density polyethylene were thoroughly mixed with 3.2 parts of 2,5-bis($\alpha,\alpha$-dimethylbenzylperoxy)-2,5-dimethylhexyne-3 at 100° C. for 10 minutes.

This compound was cured for 15 minutes at 335° F. (ca. 168° C.). The molded composition had a tensile strength at room temperature of 3,061 lbs./sq. inch, and an elongation of 450%. When extracted with boiling toluene, it was found that only 10.65% was soluble, showing that this peroxide was very efficient in cross-linking the polyethylene, i.e., the number of cross-links formed in the polymer per molecule of curing agent decomposing was relatively high.

One part of the same acetylenic unsaturated compound was incorporated into 10 parts of low density polyethylene by milling on differential rolls heated to 110–115° C. until a uniform dispersion was obtained (ca. 1 minute). This compound was molded for 30 minutes at 170° C. using sufficient pressure to cause the material to extrude from the flash-type mold. When tested at 150° C., the molded material had a tensile strength of 64.5 lbs./sq. inch and an elongation of 496%. This shows that the molded material was cross-linked or cured since this type of polyethylene, if not cross-linked, has no tensile strength at 110° C.

The above example was repeated two more times, in one compound 50 parts of clay (pH 7.4) was incorporated as a typical filler material having basic characteristics to produce Compound A. In the second compound, 50 parts of calcined clay (pH 6–6.2) was incorporated as a typical filler having acidic characteristics to produce Compound B. In both cases 1.75 parts of a commercially available condensation product of acetone and aniline was incorporated as an antioxidant. Both compounds were thoroughly blended by milling each for 20 minutes at a temperature of 100° C. on differential rolls. Both Compounds A and B were molded at 335° F. for 15 minutes using a pressure of 1000 lbs./sq. inch on the mold. Compound A had a tensile strength of 2353 lbs./sq. inch and an elongation of 393%, whereas Compound B had a tensile strength of 2193 lbs./sq. inch and an elongation of 383%. When extracted with boiling toluene, the amount dissolved was 7.92 and 7.80, respectively, for Compounds A and B.

*Example 4*

Two compositions were made each containing 10 parts of low density polyethylene and 0.2 part of each of the following acetylenic unsaturated compounds: Compound A contained 3-($\alpha,\alpha$-dimethylbenzylperoxy)-3-methylbutyne-1, and Compound B contained 2,5-bis(1,1-dimethylpropyneperoxy)-2,5-dimethylhexane. Each of these compositions was milled together on a set of differential rolls heated to 110–115° C. for about one minute to give a uniform blend. The compounds were molded for 30 minutes at 170° C. in a flash type mold to produce molded sheets. At 150° C., the molded Compounds A and B had tensile strengths of 35.7 and 22.5 p.s.i., respectively, showing that both acetylenic materials had effectively cross-linked the polyethylene.

*Example 5*

Three compositions were made each containing 10 parts of low density polyethylene and 0.1 part of the following acetylenic unsaturated compounds: Compound A contained 2,5-bis(t-butylperoxy)-2,5-diphenylhexyne - 3; Compound B contained 2,5-bis(t-butylperoxy)-2,5-dimethylhexyne-3; and Compound C contained 2,5-bis(α,α-dimethylbenzylperoxy)-2,5-diphenylhexyne-3. Each of these compounds was thoroughly blended on hot differential rolls heated to a temperature of 110–115° C. for about one minute to give uniform blends. The compounds were molded into sheets at 170° C. for 30 minutes using sufficient pressure to cause the compound to flash from the flash-type mold. When tested at 150° C., these molded samples had tensile strengths of 43.5, 42.6, and 54.6 p.s.i., respectively, for Compounds A, B and C, proving that each of these materials had effectively cross-linked the polyethylene.

*Example 6*

A flameproof composition suitable for extruding an electrical conductor was made from the following ingredients:

| | Percent |
|---|---|
| Copolymer of a major amount of ethylene and a minor amount of butene-1 (density 0.932) | 36.5 |
| Antimony oxide | 16.5 |
| Hydrated alumina (surface coated with stearic acid) | 22.7 |
| Trimethyldihydroxyquinoline polymer | 0.5 |
| Chlorinated triphenyl (approximately 60% chlorine) | 18.3 |
| 2,5-bis(t-butylperoxy)2,5-dimethylhexyne - 3 (50% mixture with silica filler) | 5.5 |

A 22-lb. batch of the above composition was thoroughly blended together and sheeted on a 2-roll differential mill to give a uniform composition which was granulated, extruded onto a copper conductor, and cured in a continuous vulcanizing machine. During the extrusion, the compound was held at a temperature of 265° F. and the copper conductor with the extruded coating was passed into an 80-foot long steam chamber attached to the forming die. The insulated wire was drawn through the steam chamber heated with steam at 225 p.s.i.g. at a linear speed of 95 ft. per minute. A total of 10,000 feet of copper wire was insulated by this process. A sample of the cured insulation on removal from the wire exhibited a room temperature tensile strength of 2,880 p.s.i. and an elongation of 360%. A sample of this insulated conductor was placed under a 90° chisel which supported a weight of 350 grams. When heated to 125° C. for 10 minutes, the chisel did not penetrate through to the conductor. When a sample of the insulated wire was exposed to a flame of a 0.5 inch bore Bunsen burner for 30 seconds, the composition was found to be self-extinguishing.

*Example 7*

A flameproof composition suitable for preparing insulated electrical conductors was made from the following composition:

| | Percent |
|---|---|
| Copolymer of a major amount of ethylene and a minor amount of butene-1 | 44.4 |
| Vinyl chloride polymer stabilized with 4 parts of barium cadmium soap for every 100 parts of polymer | 20.2 |
| Powdered clay (a calcine hydrated aluminum silicate) | 8.6 |
| 4,4'-thio-bis-(6-p-butyl-m-cresol) | 0.2 |
| 2,5-bis-(t-butylperoxy)-2,5-dimethyl-hexyne-3 50% mixture with finely divided silica | 8.0 |

The above components were compounded and extruded on copper wire in the same way as described above in Example 6, except that the temperature during the extrusion was 270° F., steam pressure in the vulcanizing section was 248 p.s.i.g., and the insulated conductor's speed through the vulcanizer was 75 ft./min.

Samples of insulation when removed from the conductor were found to have tensile strengths at room temperature of 2,420 p.s.i. and an elongation of 240%. When aged for 6 days at 180° C., the insulation was found to be still flexible and exhibited a tensile strength of 2,050 p.s.i. and an elongation of 60%. When held in a Bunsen flame as described in Example 6, the insulated wire was found to be self-extinguishing.

When attempts were made to substitute dicumyl peroxide or the saturated homolog of the peroxide used in Example 6 and Example 7, specifically 2,5-bis(t-butylperoxy)-2,5-dimethylhexane in the compositions similar to those of Example 7, it was found that both peroxides caused precuring and scorching of the compositions in the extruder so it was impossible to continue extrusion of the insulation on the wire after a short time. Although the insulation was satisfactory at the start of the extrusion, the surface grew progressively rougher as scorching progressed up to the time the extrusion had to be stopped when a total of 500 ft. of wire had been covered. Scorchings, such as encountered here, is due to premature curing of the plastic composition in the extrusion cylinder. Attempts to prevent this scorching by reducing the temperature were unsuccessful since this caused the plastic to be so stiff that it could not be extruded onto the conductor to produce a satisfactory insulation.

*Example 8*

Two compositions were made using high density polyethylene (0.96) as follows:

| | Grams |
|---|---|
| Compound A: | |
| High density polyethylene | 300 |
| Finely divided (15 microns) silica | 600 |
| 50% mixture of 2,5-bis(t-butylperoxy)-2,5-dimethylhexyne-3 with silica | 12 |
| Polymerized trimethyldihydroxyquinoline | 3 |
| Compound B: | |
| High density polyethylene | 200 |
| Finely divided (15 microns) silica | 600 |
| 50% mixture of 2,5-bis(t-butylperoxy)-2,5-dimethylhexyne-3 with silica | 16 |
| Polymerized trimethyldihydroxyquinoline | 2 |

Each of the above compounds was prepared by milling the ingredients, except for the 2,5-bis(t-butylperoxy)-2,5-dimethylhexyne-3, together until thoroughly blended and then adding the peroxy compound and continuing the milling until a uniform blend is obtained. Each of these compounds was molded for 45 minutes at a temperature of 325° F. in a flash type mold using sufficient pressure to close the mold and cause excess material to flash from the mold. Tensile test samples were cut from each of the molded sheets and tested at room temperature and 150° C. with the following results:

| Compound | Temperature | Tensile Strength, p.s.i. | Elongation, percent |
|---|---|---|---|
| A | Room temperature | 2,350 | 17 |
| A | 150° C | 356 | 43 |
| B | Room temperature | 2,780 | 13 |
| B | 150° C | 459 | 39 |

These results definitely show that the materials were well cured since polyethylene which had not been cross-linked would have had essentially no tensile strength whatsoever at 150° C.

From the foregoing, it is readily apparent that the polyethylene compositions which have been cured by means of the acetylenic unsaturated compounds in accordance with this invention are greatly enhanced in their form stability. These cured polyethylene compositions as described also possess good solvent resistance, improved tensile strength and tear strength, etc. These properties make the new materials particularly useful as insulating tapes, wire coatings, spark plug insulators, gaskets, etc. Thus, these polymeric materials prepared according to this invention can be used advantageously in electrical applications where polyethylene compositions themselves have been unsuccessful because of their inability to withstand elevated temperatures.

The compositions of this invention whether they be molding powders, solutions, dispersion or porous masses, can also be advantageously used for extrusion into filaments, sheets, rods, tubes, and over wire to produce insulating coatings. These compositions may also be injection or compression molded, calendered or otherwise fabricated into articles of various shapes. These articles may afterwards be heat treated at temperatures above their fabricating temperature to cure the polymer rendering the article much less soluble in hot solvents and more resistant to deformation at elevated temperatures than uncured polyethylene. Other uses will be apparent to those skilled in the art.

These and other modifications of this invention which will readily be discernible to those skilled in the art may be employed within the scope of the invention. The invention is intended to include all those modifications and variations as may be embraced within the following claims.

What I claim as new and desire to secure by Letters Patent of the United States is:

1. A curable composition comprising an admixture of polyethylene and from 0.5 to 10% by weight of 2,5-bis(t-butylperoxy)-2,5-diphenylhexyne-3.

2. The composition of claim 1 which has been cured by heating to a temperature in the range of 150° C. to just below the decomposition temperature of the polyethylene.

References Cited

UNITED STATES PATENTS

| | | | |
|---|---|---|---|
| 2,916,481 | 12/1959 | Gilmont | 260—41 |
| 2,930,083 | 3/1960 | Vostovich et al. | 260—41 |
| 3,039,989 | 6/1962 | Eastman | 260—45.5 |
| 3,214,422 | 10/1965 | Mageli | 260—94.9 |

OTHER REFERENCES

J. Am. Chem. Soc., 74, 1471–1473 (1952) by N. A. Milas and O. L. Mageli Copy in Scientific Library.

JOSEPH L. SCHOFER, *Primary Examiner.*

L. J. BERCOVITZ, *Examiner.*

J. A. KOLASCH, L. EDELMAN, *Assistant Examiners.*